United States Patent [19]

Shoemaker

[11] 3,983,891
[45] Oct. 5, 1976

[54] VENT VALVE

[76] Inventor: John C. Shoemaker, 12120 Yellow River Road, Fort Wayne, Ind. 46818

[22] Filed: May 7, 1975

[21] Appl. No.: 575,183

[52] U.S. Cl. .................................. 137/43; 137/587; 220/374
[51] Int. Cl.² .......................................... F16K 17/36
[58] Field of Search ............ 137/43, 202, 582, 587, 137/519.5, 533.11; 136/177, 178; 220/373, 374

[56] References Cited
UNITED STATES PATENTS

| | | | |
|---|---|---|---|
| 1,190,654 | 7/1916 | Kammerhoff | 136/178 |
| 1,859,479 | 5/1932 | Thwaits | 137/43 |
| 2,376,123 | 5/1945 | Cohen | 137/43 |

FOREIGN PATENTS OR APPLICATIONS

| 262,410 | 6/1970 | U.S.S.R. | 137/533.11 |
|---|---|---|---|

*Primary Examiner*—Robert G. Nilson

[57] ABSTRACT

This invention relates to a vent valve having an elongated housing. The housing has an inlet port positioned below an outlet port when the housing is in an upright position. A passage connects the inlet and outlet parts. The passage construction provides free passage of gaseous fluid but restricts momentary liquid flow or splash when the housing is in an upright position. A ball valve in the passage restricts liquid flow when the housing is tilted more than 90° from its upright position.

7 Claims, 8 Drawing Figures

U.S. Patent   Oct. 5, 1976   3,983,891
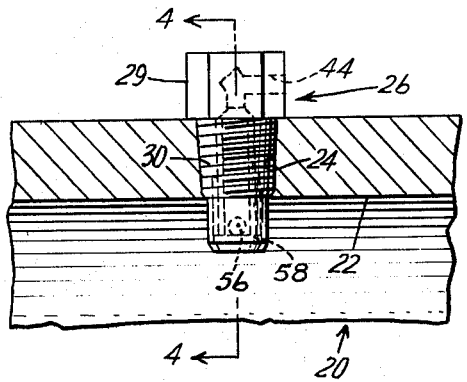
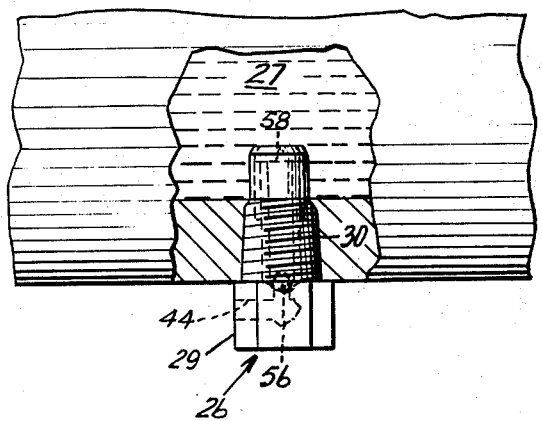
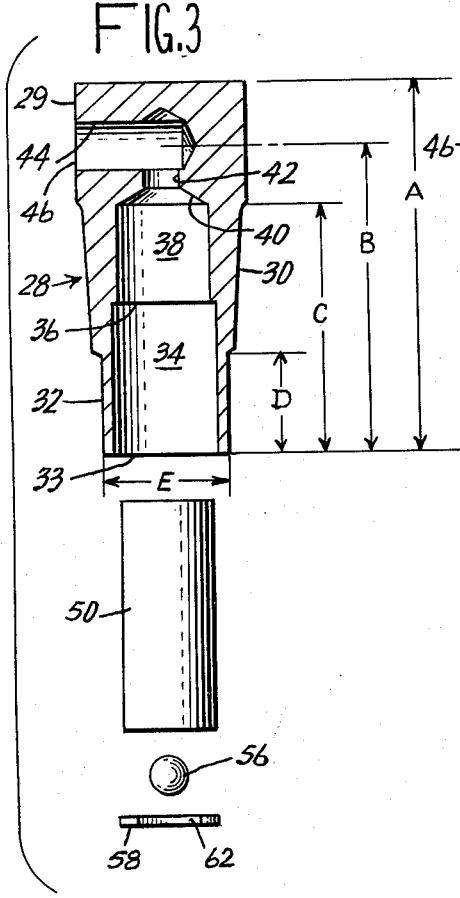
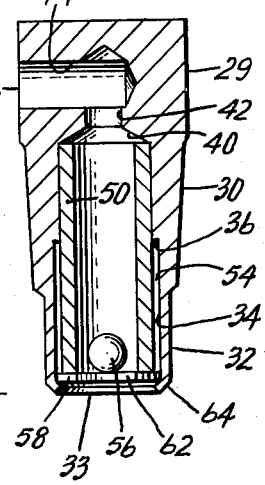
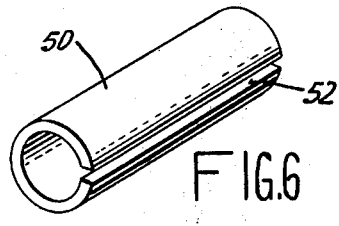
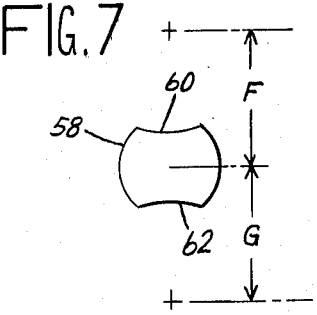
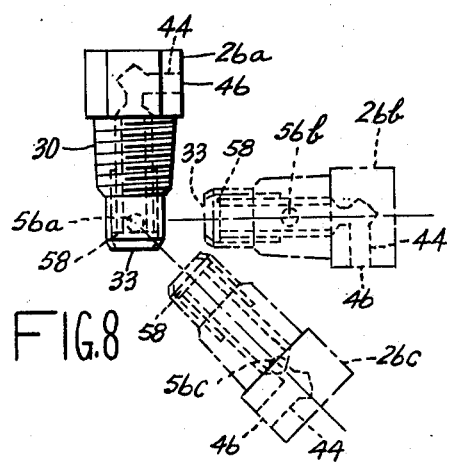

VENT VALVE

BACKGROUND OF THE INVENTION

1. Field of the Invention

This invention relates to vent valves for use on fuel tanks and the like.

2. Description of the Prior Art

Vent valves in the art have been designed for equalizing pneumatic pressures between the interior and exterior of a sealed tank and also to resist passage of liquid splashing thereagainst. Further, these valves have means for closing the vent upon tilting of the tank beyond a predetermined angle. These valves have been relatively expensive to manufacture and the interacting functions of resistance to splash flow and valve closure upon tilting have proved difficult to be reliably performed. Also, relatively close tolerances have been required between the valve parts.

SUMMARY OF THE INVENTION

A vent valve having an elongated housing for attachment to and through the upper wall of a fuel tank or the like, is provided with an inlet port at that housing end communicating with the tank interior. An elongated passage is formed in the housing providing communication between the inlet port and a right angle bore which terminates in an outlet port on a side of the housing.

An elongated sleeve having a longitudinal slot is fitted inside the passage. An annular passage is defined between a sleeve end portion and the passage wall adjacent the inlet port. A disc having an arcuate indent on each of opposite edges thereof is secured against the sleeve end in the inlet end of the passage. The indents are circumferentially displaced 90° from the slot.

A ball seat is formed intermediately of the passage. A ball is placed in the sleeve prior to securing the disc at the passage end. The ball is movable to and registrable with the ball seat to restrict liquid flow when the housing is tilted more the 90° from an upright position.

It is therefore an object of this invention to provide a simplified, economical vent valve which will readily pass gaseous fluid but will effectively restrict passage of a liquid splash.

It is an object to provide in the valve of the foregoing object a restriction to liquid flow through the valve when the valve is tilted a predetermined degree from its upright position.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a side view of a vent valve of this invention secured through the upper wall of a fuel tank which is shown sectioned and broken away;

FIG. 2 is a view similar to that in FIG. 1 with the fuel tank and valve inverted;

FIG. 3 is an exploded view of a preferred embodiment of this invention with portions shown in section;

FIG. 4 is a section taken at 4—4 of the valve shown in FIG. 1;

FIG. 5 is an enlarged bottom view of the valve shown in FIG. 4;

FIG. 6 is a view in perspective of the valve sleeve;

FIG. 7 is a top view of the valve disc; and

FIG. 8 is a view of the valve shown in an upright position, a 90° tilted position, and a tilted position greater than 90°.

DESCRIPTION OF THE PREFERRED EMBODIMENT

Referring to FIG. 1, a fuel tank 20 has an upper wall 22 having a threaded hole 24. Tank 20 typically is for engine or other fuel and is generally of a metallic construction. A vent valve 26 is threadedly engaged in hole 24 and provides unrestricted gaseous fluid passage between the interior of tank 20 and the ambient air, whereby the gaseous pressures within and without the tank are equalized. However, valve 26 restricts the passage of any fuel splashed thereagainst during tank movement such as would occur when the tank is used in or on a vehicle, not shown.

Valve 26 also restricts liquid passage when it is inverted. FIG. 2 shows tank 20 and valve 26 inverted in which position the flow of liquid 27 from tank is prevented. Should the vehicle to which the tank is secured overturn, or the tank in any other manner is overturned or tilted, fuel or liquid leakage therefrom, and resultant damage, hazardous conditions and liquid wastage, are prevented.

Referring to FIGS. 3–7, a valve 26 has an elongated body 28, of brass or other suitable metal, a hexagonal head 29, an intermediate threaded portion 30 and an annular stem 32 extending longitudinally from portion 30 and terminating in inlet port 33.

A cylindrical passage 34 is formed longitudinally of elongated body 28, and is stepped inwardly at 36 forming a second passage 38 concentric with passage 34 and having a smaller diameter. Passage 38 is tapered inwardly at 40 and terminates in a ball seat 42. Seat 42 connects passage 38 with right angle bore 44. Outlet 46 is formed by the intersection of bore 44 and a vertical face of hexagonal head 29. Since bore 44 is horizontal and outlet 46 is in a vertical plane, entry into the tank of impurities or falling moisture is resisted. A barbed extension may be inserted in and extend horizontally from bore 44.

An elongated sleeve 50 having a longitudinal slot 52 along the length thereof, is made of a metallic spring material and is slightly compressed and inserted in cylindrical passage 38 with the spring resilience holding sleeve 50 snugly therein, and against rotation relative thereto. An annular space 54 is defined between the lower end portion of sleeve 50 and passage 34.

A chrome steel ball 56 is inserted in sleeve 50. A retainer disc 58 of a metallic material has two arcuate edges 60 and 62 which are diametrically opposite, to define corresponding arcuate indents in disc 58. Disc 58 is inserted in passage 34 until it abuts the lower end of sleeve 50 with the edges 60 and 62 being circumferentially spaced 90° from slot 52 for reasons which will become apparent. The lower end of stem 32 is then turned inwardly at 64 to securely hold disc 58 against the bottom of sleeve 50 and prevent relative rotation therebetween. Disc 58 and edges 60 and 62 are dimensioned so that the opening defined by the bottom of sleeve 50 is covered (FIG. 5), but the indents 60 and 62 provide communication with space 54. All fluid must pass through space 54 from tank 20 to exit through valve 26. With this construction, ball 56 may have a diameter considerably smaller than sleeve 50 for freedom of movement therein.

In operation, valve 36 is threadedly secured to an upper wall 22 of a fuel tank 20 or the like. In the upright valve position shown in FIG. 1, a gaseous path is provided through the indents defined by edges 60 and 62 in disc 58, the annular passage 54, slot 52, the cylindrical passage defined by sleeve 50, through ball seat 42, and right angle passage 44 to a receiver outside of tank 20. A receiver may include anything that is accepting the exhaust gases or gaseous fluids from the vent valve such as a canister filter. The receiver may also be the atmosphere. In this manner, pneumatic pressure inside tank 20 is equalized with the receiver pressure. Tank pressure changes are occasioned during fuel level changes and temperature changes. However, when liquid fuel splashes against the bottom of valve 26, only a small fraction of the splashed fuel is passed by the indents in disc 58. That liquid which is passed is restricted from further movement through the valve 26 by virtue of the relatively small, confined, annular space 54. In order for the liquid to progress further through the valve, it must change direction and pass radially inwardly through slot 52 which further restricts its flow. To exit the valve 26, it must again change direction to move axially upwardly through sleeve 50, pass through valve seat 42, and make another turn radially outwardly in right angle passage 44. The tortuous path thus described effectively prevents any splash from the exiting the tank.

Referring to FIG. 8, valve 26 is shown in an upright position 26a. It is also shown in position 26b which is tilted 90° from the upright position and position 26c where the valve is tilted at an angle greater than 90° from the upright position. In the upright position, ball 56 is in position 56a and resting on the upper surface of disc 58. In the 90° position, ball 56 has moved to position 56b and is resting on the inner surface of sleeve 50. In valve position 26c, ball 56 has moved to position 56c and is seated on valve seat 42 thereby effectively preventing liquid flow through valve 26, preventing loss of fuel during a tilted tank position.

In the following is listed values of the various components of a working embodiment of this invention, these values being given as exemplary only and not to be considered as limitative of the invention:

| Reference Letter | Dimension |
|---|---|
| A | 1.250'' |
| B | 1.020'' |
| C | .825'' |
| D | .320'' |
| E | .420'' |

Drill Sequence in stem 32:
Drill ⅛ inch diameter × 1.100 inches deep
Drill 5/16 inch diameter × 0.825 inch deep
Drill 0.358 inch diameter × 0.500 inch deep Drill Sequence for Opening 46 and Bore 44:
Drill 0.1495 inch diameter × 0.312 inch deep
Material of body 28
Brass (No. 230)
Sleeve 50: 5/16 inch × ¾ inch long; 0.062 inch wall thickness
Ball 56: 0.156 inch diameter Chrome Steel
Disc 58: 0.350/0.348 inch diameter; 0.050 inch height; material C4160
Radium of edges 60 and 62, 0.175/0.178 inch; Dimensions F & G
(Center locations of edges 60 and 62 radii each 0.288/0.280 inch, FIG. 7)

While there have been described above the principles of this invention in connection with specific apparatus, it is to be clearly understood that this description is made only by way of example and not as a limitation to the scope of the invention.

What is claimed is:

1. A vent valve comprising:
   an elongated housing having inlet and outlet ports,
   an elongated cylindrical passage formed in said housing and connecting said inlet and outlet ports;
   an elongated sleeve having a longitudinal slot formed therein being in said passage and defining an annular space therewith, a sleeve end being adjacent said inlet port:
   a disc member having at least one indented edge in the circumference thereof positioned in said inlet port and against said sleeve end with said disc covering the opening defined by said sleeve end;
   said edge defining an opening between said inlet port and said annular space; and
   said passage having a first internal diameter at the inlet end and a second internal diameter longitudinally spaced from said inlet end which is smaller than said first internal diameter, said sleeve being resiliently fitted into said second internal diameter, said annular space being defined between said sleeve and said first internal diameter.

2. The vent valve of claim 1 with said indented edges being circumferentially spaced from said slot.

3. The vent valve of claim 1 with a ball seat being formed between said passage and said output port,
   a ball being in said sleeve and registrable with said ball seat to prevent liquid flow through said passage.

4. The vent valve of claim 1 with said outlet port comprising a right angle bore.

5. The vent valve of claim 1 with said disc having two diametrically opposite indented edges, each of said edges being circumferentially spaced from said slot.

6. The vent valve of claim 5 with said edges being angularly displaced 90° from said slot.

7. The vent valve of claim 1 with said housing being externally threaded along a portion thereof.

* * * * *